United States Patent [19]
Grohoski

[11] Patent Number: 5,247,628
[45] Date of Patent: Sep. 21, 1993

[54] PARALLEL PROCESSOR INSTRUCTION DISPATCH APPARATUS WITH INTERRUPT HANDLER

[75] Inventor: Gregory F. Grohoski, Cedar Park, Tex.

[73] Assignee: International Business Machines Corporation, Armonk, N.Y.

[21] Appl. No.: 467,315

[22] Filed: Jan. 17, 1990

Related U.S. Application Data

[63] Continuation of Ser. No. 126,818, Nov. 30, 1987, abandoned.

[51] Int. Cl.[5] .................. G06F 9/38; G06F 11/00; G06F 11/30
[52] U.S. Cl. .................. 395/375; 395/725; 371/12; 371/13
[58] Field of Search .............. 364/200, 900; 395/375, 395/725, 575; 371/12, 13

[56] References Cited

U.S. PATENT DOCUMENTS

| | | | |
|---|---|---|---|
| 3,736,566 | 5/1973 | Anderson et al. | 395/575 |
| 4,044,337 | 8/1977 | Hicks et al. | 395/250 |
| 4,110,822 | 8/1978 | Porter et al. | 395/375 |
| 4,200,927 | 4/1980 | Hughes et al. | 395/375 |
| 4,205,370 | 3/1980 | Hirtle | 395/575 |
| 4,471,433 | 9/1984 | Matsumoto et al. | 395/375 |
| 4,477,872 | 10/1984 | Losq et al. | 395/375 |
| 4,507,732 | 3/1985 | Catiller et al. | 395/275 |
| 4,524,415 | 6/1985 | Mills, Jr. et al. | 395/575 |
| 4,532,589 | 7/1985 | Shintani et al. | 395/375 |
| 4,541,047 | 9/1985 | Wada et al. | 395/375 |
| 4,594,655 | 6/1986 | Hao et al. | 395/775 |
| 4,594,661 | 6/1986 | Moore et al. | 395/775 |
| 4,626,989 | 12/1986 | Torii | 395/375 |
| 4,644,465 | 2/1987 | Imamura | 395/725 |
| 4,709,324 | 11/1987 | Kloker | 395/725 |
| 4,740,969 | 4/1988 | Fremont et al. | 371/12 |
| 4,745,547 | 5/1988 | Buchholz et al. | 395/800 |
| 4,751,639 | 6/1988 | Cororan et al. | 395/575 |
| 4,763,294 | 8/1988 | Fong | 395/375 X |
| 4,777,587 | 10/1988 | Case et al. | 395/375 |
| 4,782,441 | 11/1988 | Inagami et al. | 395/800 |
| 4,791,555 | 12/1988 | Garcia et al. | 395/800 |
| 4,797,816 | 1/1989 | Uchiyama et al. | 395/400 |
| 4,805,095 | 2/1989 | Armstrong et al. | 395/775 |
| 4,809,159 | 2/1989 | Sowa | 395/800 |
| 4,811,211 | 3/1989 | Sandman et al. | 395/725 |
| 4,811,215 | 3/1989 | Smith | 395/375 |
| 4,814,978 | 3/1989 | Dennis | 395/375 |
| 4,875,160 | 10/1989 | Brown, III | 395/375 |
| 4,893,234 | 1/1990 | Davidson et al. | 395/800 |
| 4,956,800 | 9/1990 | Kametani | 395/375 X |
| 4,965,882 | 10/1990 | Barabash et al. | 395/500 |

OTHER PUBLICATIONS

D. C. Tjon-Pian-Gi, "Vector-Register Rename Mechanism", IBM Technical Disclosure Bulletin, vol. 25, No. 1, Jun., 1982 pp. 86-87.

R. Cytron, "Doacross: Beyond Vectorization for Multiprocessors" (Extended Abstract), 1986 IEEE Int. Conf. on Parallel Processing pp. 836-844.

(List continued on next page.)

Primary Examiner—Joseph L. Dixon
Assistant Examiner—Michael A. Whitfield
Attorney, Agent, or Firm—Thomas E. Tyson; Paul S. Drake

[57] ABSTRACT

A data processing system for executing a sequence of instructions. The data processing system includes several processors each for executing instructions. Also included is a dispatching apparatus for dispatching each of the instructions to one of the processors. Control circuitry is included for directing the concurrent execution of the dispatched instructions in the processors irrespective of the location of the instructions in the sequence. The control circuitry includes the capability to receive an instruction interrupt signal. The control circuitry then determines which instruction generated the instruction interrupt. Upon this determination, the control circuitry resets the processors and the dispatching apparatus to the state that existed when the instruction that generated the instruction interrupt was earlier executed in order to re-execute the instruction that caused the interrupt signal in accordance with its location in the instruction sequence.

10 Claims, 14 Drawing Sheets

OTHER PUBLICATIONS

P. Tang et al., "Processor Self-Scheduling for Multiple-Nested Parallel Loops", Proc. 1986 Int. Conf. Parallel Proc. Aug. 1986, pp. 528–535.

*IBM Technical Disclosure Bulletin,* vol. 23, No. 11, Apr. 1981, p. 5271, "Instruction Nullification by Saving and Restoring Architected Data".

*IBM Technical Disclosure Bulletin,* vol. 17, No. 8, Jan., 1975, pp. 2239–2242, "Instruction Retry Mechanism for a Computer".

IBM Technical Disclosure Bulletin, vol. 15, No. 5, Oct., 1972, pp. 1576–1577, "Emulator Instruction Retry".

*IBM Technical Disclosure Bulletin,* vol. 13, No. 12, May, 1971, pp. 3855–3856, "Instruction Retry".

*IBM Technical Disclosure Bulletin,* vol. 25, No. 10, Mar., 1983, p. 5300, "Instruction Retry Mechanism for a Multicroprocessor System".

*IBM Technical Disclosure Bulletin,* vol. 11, No 11, Apr., 1969, pp. 1409–1410, "Error Retry Implementation".

*IBM Technical Disclosure Bulletin,* vol. 22, No. 5. Oct., 1979, pp. 1809–1810, "Restoration of Arrays Containing Bad Parity".

IBM Technical Disclosure Bulletin, vol. 22, No. 5, Oct., 1979, pp. 1811–1812, "Microcode Control for Instruction Retry".

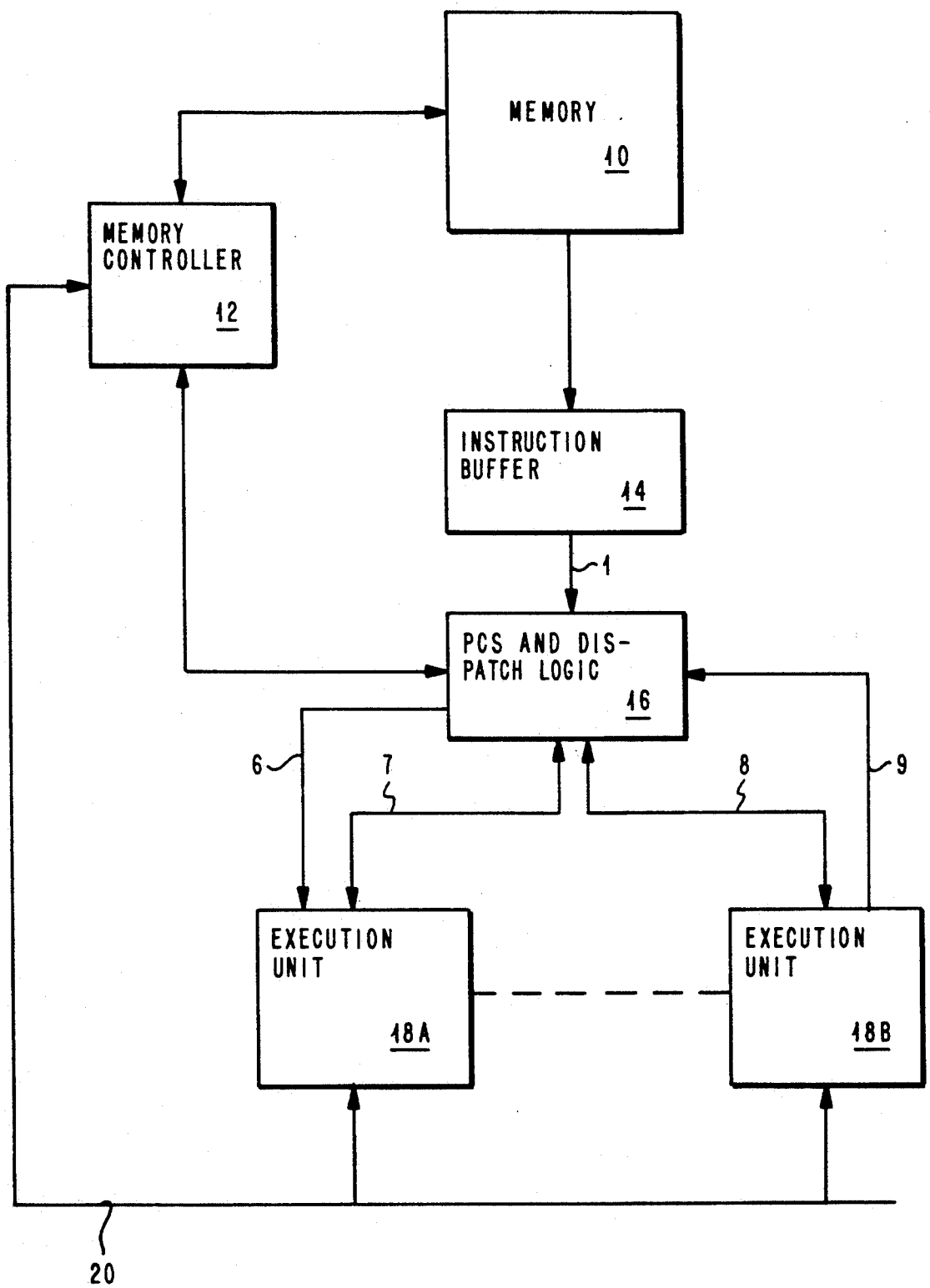
F I G. 1

PARALLEL PROCESSOR INSTRUCTION DISPATCH APPARATUS WITH INTERRUPT HANDLER

This is a continuation of application Ser. No. 07/126,818 filed Nov. 30, 1987 now abandoned.

DESCRIPTION

1. Technical Field

This invention relates to data processing and more specifically to interrupt processing in a parallel data processing system.

2. Background Art

Traditional processors execute instructions in a serial fashion, i.e., one instruction at a time. In order to increase the operating efficiency and speed of execution of data processing systems, parallel processing has been implemented. Parallel processing provides for the concurrent execution of instructions. However, it is desirable to concurrently execute the instructions in such a manner that they will appear to be serially executed. The use of multiple execution units in a data processing system provide execution of instructions concurrently when several instructions can be distributed or dispatched to individual execution units for simultaneous execution during a time period or cycle. An instruction dispatching apparatus is required to determine which instructions should be dispatched to which execution units. An example of one such dispatching apparatus is disclosed in the *IBM Technical Disclosure Bulletin*, Volume 29, No. 1, June, 1986, entitled "Branch-Processing Instruction Cache", pages 357-359. This disclosure illustrates a mechanism for fetching instructions and includes the capability to process branch instructions while other instructions are being fetched.

One problem that arises in the parallel concurrent processing of instructions is the handling of an instruction generated interrupt in a manner that will maintain the appearance of serial instruction execution.

It is the object of the present invention to provide a mechanism for handling interrupts while providing for the concurrent execution of instructions.

DISCLOSURE OF THE INVENTION

In accordance with the present invention, a data processing system for executing a sequence of instructions is provided. The data processing system includes several processors, each for executing instructions. Also included is a dispatching apparatus for dispatching each of the instructions to one of the processors. A control apparatus is included for directing the concurrent execution of the dispatched instructions in the processors irrespective of the locations of the instructions in the sequence. The control apparatus includes the capability to receive an instruction interrupt signal. Upon receiving the instruction interrupt signal, the control apparatus determines which instruction execution generated the instruction interrupt. The control apparatus includes the capability to reset the processors and the dispatching apparatus to the state that existed when the instruction that generated the instruction interrupt signal was first executed in order to re-execute the instruction that caused the interrupt.

In the preferred embodiment, the control apparatus includes the capability to maintain a history of which instructions were dispatched to which processors. The control apparatus further maintains a record of the contents of selected registers. Upon the occurrence of an interrupt signal, the control apparatus is able to determine the state of these registers and the state of the processors that existed at the time the instruction was first executed. The control apparatus then reinitializes all of the processors with the information that has been stored to place the processors and the instruction dispatching apparatus into the state that existed when the instruction that caused the interrupt was first executed.

BRIEF DESCRIPTION OF THE DRAWING

The novel features believed characteristic of the invention are set forth in the appended claims. The invention itself, however, as well as the other features and advantages thereof, will be best understood by reference to the detailed description which follows, read in conjunction with the accompanying drawings, wherein:

FIG. 1 is a block diagram of a parallel data processing system;

FIG. 15 is a table listing twelve instructions that are to be dispatched for execution by the execution units.

BEST MODE FOR CARRYING OUT THE INVENTION

Figure 2:
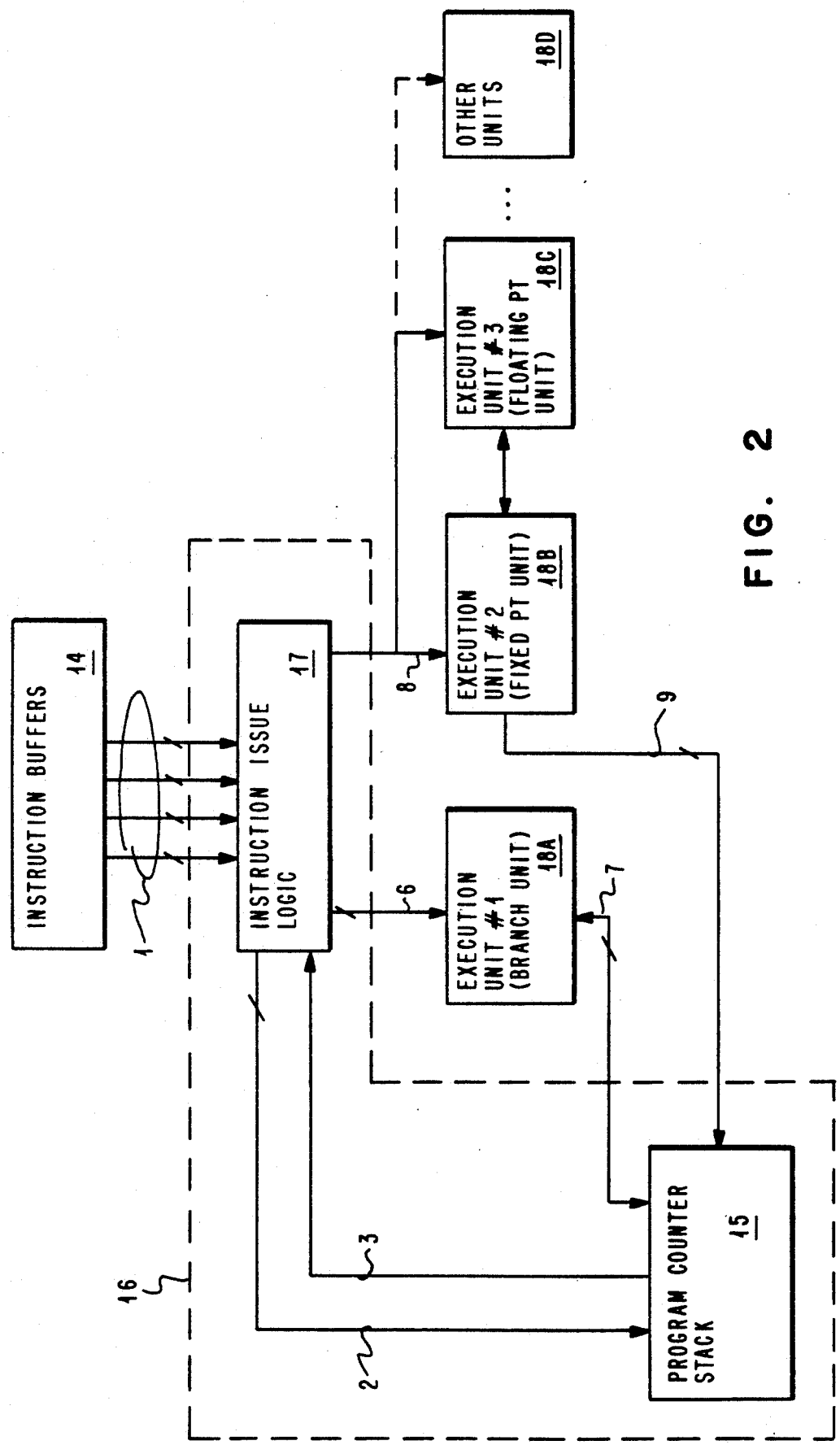
FIG. 2 is a block diagram illustrating a portion of the data processing system of FIG. 1.

This invention provides a mechanism for the parallel and concurrent execution of several instructions while permitting interrupts to be processed in such a manner that the instruction execution will appear to be serial.

FIG. 1 is a block diagram illustrating a data processing unit including a memory 10 connected to a memory controller 12 and instruction buffer 14. Connected to the instruction buffer 14 is a program counter stack and instruction dispatch logic 16. Several execution units 18a through 18d are in turn connected to the program counter stack and instruction dispatch logic 16. The execution units 18a through 18d are connected to an information bus 20 which provides for the distribution of information throughout the data processing system.

FIG. 2 is a block diagram illustrating the instruction buffers 14 connected via bus lines 1 to instruction issue logic 17. The instruction issue logic 17 is further connected via buses 2 and 3 to the program counter stack 15. The instruction issue logic 17 and the program counter stack 15 make up the block 16 of FIG. 1. Also illustrated are instructions units 18a, 18b, 18c and 18d. It should be apparent to those skilled in the art that the number of execution units included may vary in accordance with the number of instructions to be concurrently executed. In the preferred embodiment, execution unit 18a executes branch instructions. Execution unit 18b executes fixed point arithmetic instructions. Execution unit 18c executes floating point arithmetic instructions. In this preferred embodiment, execution units 18a through 18c are the only ones that are functional.

The instruction buffer 14 stores a large group of instructions that are received from the memory 10 (FIG. 1). The instruction issue logic 17 loads instructions from the instruction buffer 14 into the available execution units 18a through 18d. In the preferred embodiment, the instruction issue logic 17 can load four instructions simultaneously to the execution units 18a-18d. The instruction issue logic 17 further determines which instruction goes to which execution unit and if the execution unit is able to take an instruction. Furthermore, the instruction issue logic 17 provides an input over lines 2 to the program counter stack. This input includes the record of the instructions dispatched. The program stack counter 15 provides a signal over line 3 to the instruction issue logic to stop the dispatching of instructions. This signal occurs when either an interrupt has been generated or when the stacks in the program counter 15 are full. The instructions from the instruction issue logic 17 are provided to the appropriate execution units. The branch execution unit 18a provides information to the program counter stack such as addresses, and the values of certain registers over line 7 such as Register 22, 24 and 26 of FIG. 3. The fixed point arithmetic instruction execution unit 18b provides signals over line 9 indicating the completion of instructions or the occurrence of an instruction interrupt signal. The fixed point arithmetic instruction execution unit 18b further provides and receives signals from the floating point arithmetic instruction execution unit 18c over line 11. These signals over line 11 provide for synchronization between the floating point and fixed point execution units for the execution of floating point load and store instructions. In this embodiment, the fixed point execution unit 18b completes address calculation for floating point load and store instructions. The fixed point execution unit 18b then sends these addresses to memory. For store instructions, the fixed point unit 18b must know when the floating point unit 18c has completed execution of the instruction so that the fixed point unit 18b will know when data is ready to be stored and therefore, when the address is ready to be transmitted. Furthermore, the fixed point unit 18b signals the occurrence of interrupts to the floating point unit 18c so that it will disregard the current floating point unit instruction.

Figure 3:
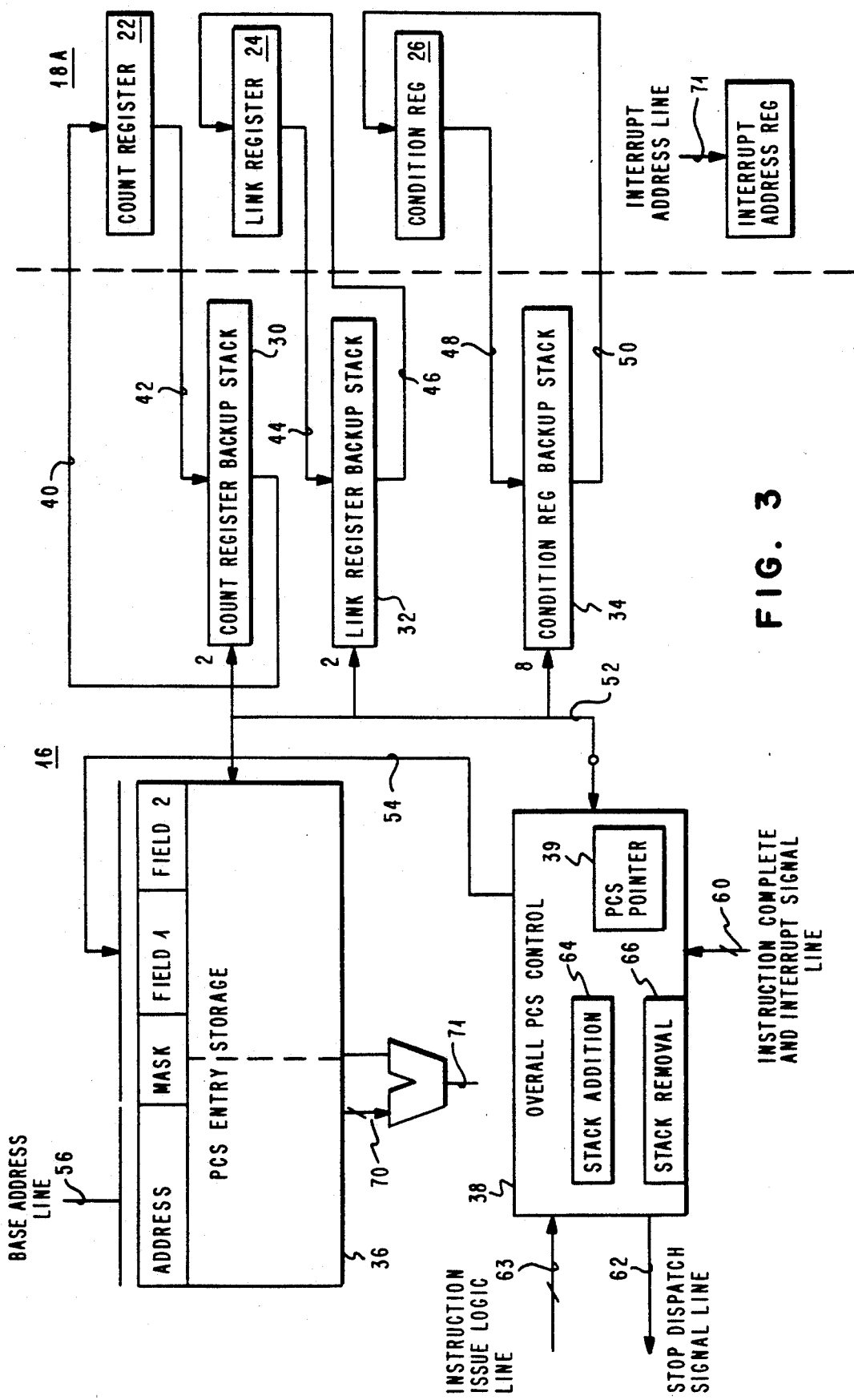
FIG. 3 is a block diagram illustrating portions of the program counter stack and the branch execution unit.

FIG. 3 illustrates, in a more detailed fashion, the intercommunication between the branch unit 18a and the program counter stack 16. In FIG. 3, the branch unit 18a is shown to contain the count register 22, the link register 24, the condition register 26, and the interrupt address register 28. The count register 22 maintains a count for the execution of loop instructions in the branch execution unit 18a. The link register 24 maintains the address for link operations such as the return from a subroutine call. The condition register 26 maintains the condition codes that result from comparison operations. The interrupt address register 28 receives the address of an instruction that has generated an interrupt. The count register 22 is connected by lines 40 and 42 to the count register backup stack 30 in the program counter stack 16. Likewise, the link register 24 is connected to the link register backup stack 32 by lines 44 and 46. Also, the condition register 26 is connected via lines 48 and 50 to the condition register backup stack 34. The interrupt address register 28 is connected via line 70 to an adder 75. The adder 75 produces the interrupt address for the interrupt register 28 via line 71. The contents of these registers 22, 24, 26 and 28 control the state of the execution of the branch execution unit 18a.

Since the occurrence of an interrupt will stop the execution of execution units 18b and 18c, the re-execution of an instruction by the branch execution unit 18a will reinitialize the execution of the instruction sequence being executed when the instruction that generated the interrupt started execution.

When the instruction issue logic 17 (FIG. 2) issues four or less instructions in a cycle, the program counter storage entry storage table 36 is updated. The base address is provided on line 56. The mask and two fields are provided from line 54 from the program counter stack control 38. The program counter stack control 38 receives this information via line 63 from the instruction issue logic 17. Additionally, the program counter stack control 38 updates stack pointers 39 which contain head pointers and tail pointers for the three backup stacks 30, 32 and 34, and executes the stack removal and stack addition functions performed by the stack addition logic 64 and stack removal logic 66.

The program counter stack control 38 regulates the operation of the backup stacks 30, 32, and 34 by line 52. Furthermore, this control 38 provides the stop dispatch signals to the instruction issue logic 17 on line 62 and receives the instruction complete and interrupt signals from the fixed point execution unit 18b on line 60 as previously discussed.

The program counter stack entry storage 36 provides the address of the interrupting instruction on line 70 to the interrupt address register 28.

Figure 4:
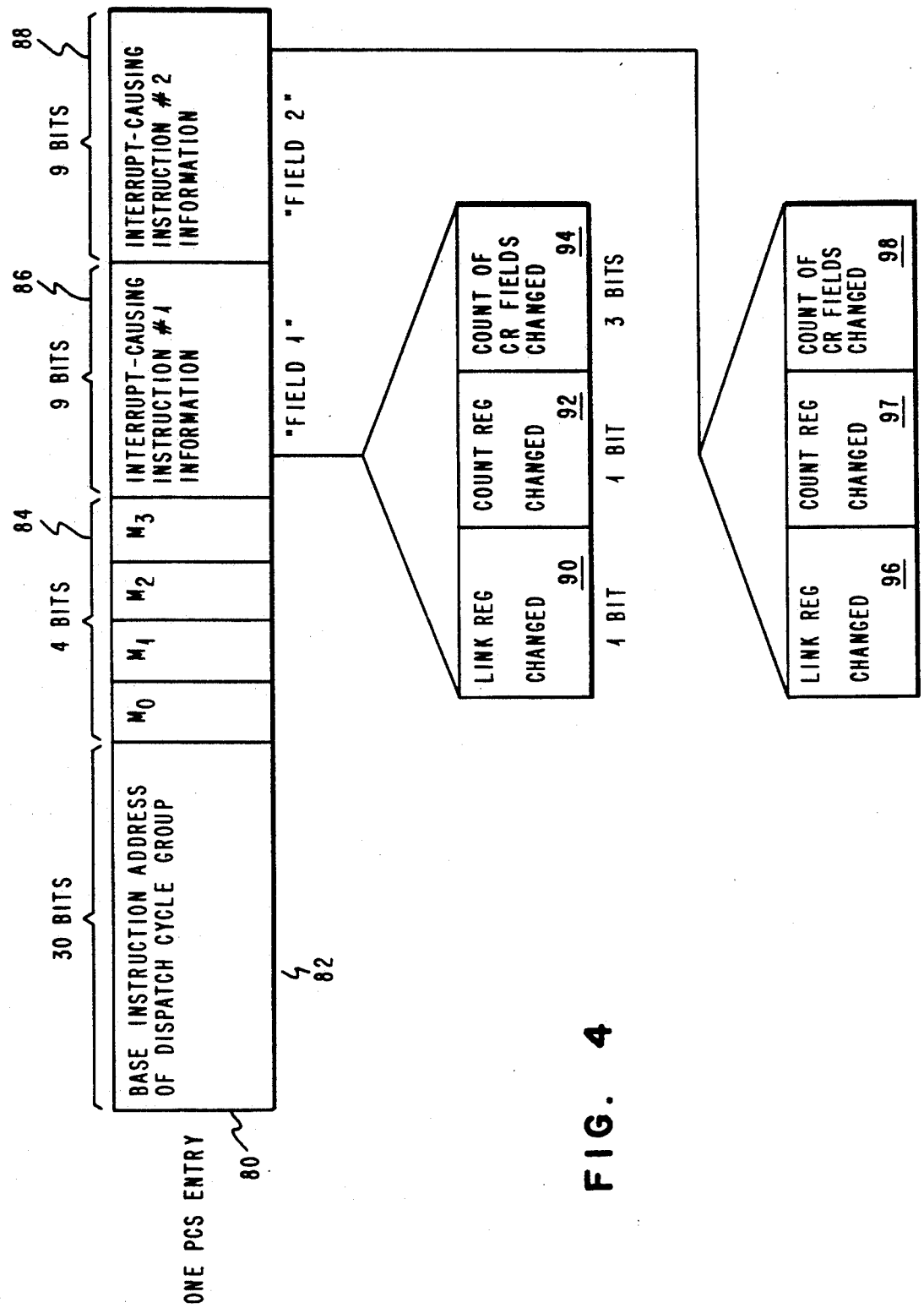
FIG. 4 is a diagram illustrating the contents of the program counter stack entry.

FIG. 4 is an illustration of the contents of the program counter stack entry storage 36 (FIG. 3). A single entry 80 is listed that includes the base instruction address field 82, the 4 bit mask field 84, the instruction 1 field 86 and the instruction 2 field 88. Field 82 is the address of the base instruction for the 4 instruction sequence that has been dispatched in the cycle by the instruction issue logic 17 (FIG. 2). The mask field 84 indicates the position of any interrupt causing instructions in this 4 instruction group. In the present embodiment, only two instructions can cause interrupts in a 4 instruction group. Therefore, there are only two instruction fields 86 and 88 provided to record these instructions. The first instruction field 86 includes subfields 90, 92, and 94. Field 94 indicates whether the link register 24 has been changed. Field 92 indicates whether the count register 22 has been changed. Field 94 indicates whether the condition register 26 has been changed. In the preferred embodiment, field 90 and 92 contain 1 bit each. Field 94 contains 3 bits indicating the three separate portions of the condition register 26. Field 88 also contains fields similar to field 86 and are illustrated as fields 96, 97 and 98 that correspond to fields 90, 92 and 94 previously discussed.

The operation of this invention is best understood by an example illustration. FIG. 15 lists twelve instructions that are to be dispatched for execution by the execution units. These instructions are divided up into three groups of four instructions each. For this example, the address of the first instruction is 1. Group I consisting of instructions 1 through 4 are dispatched in cycle 1.

Figure 5:
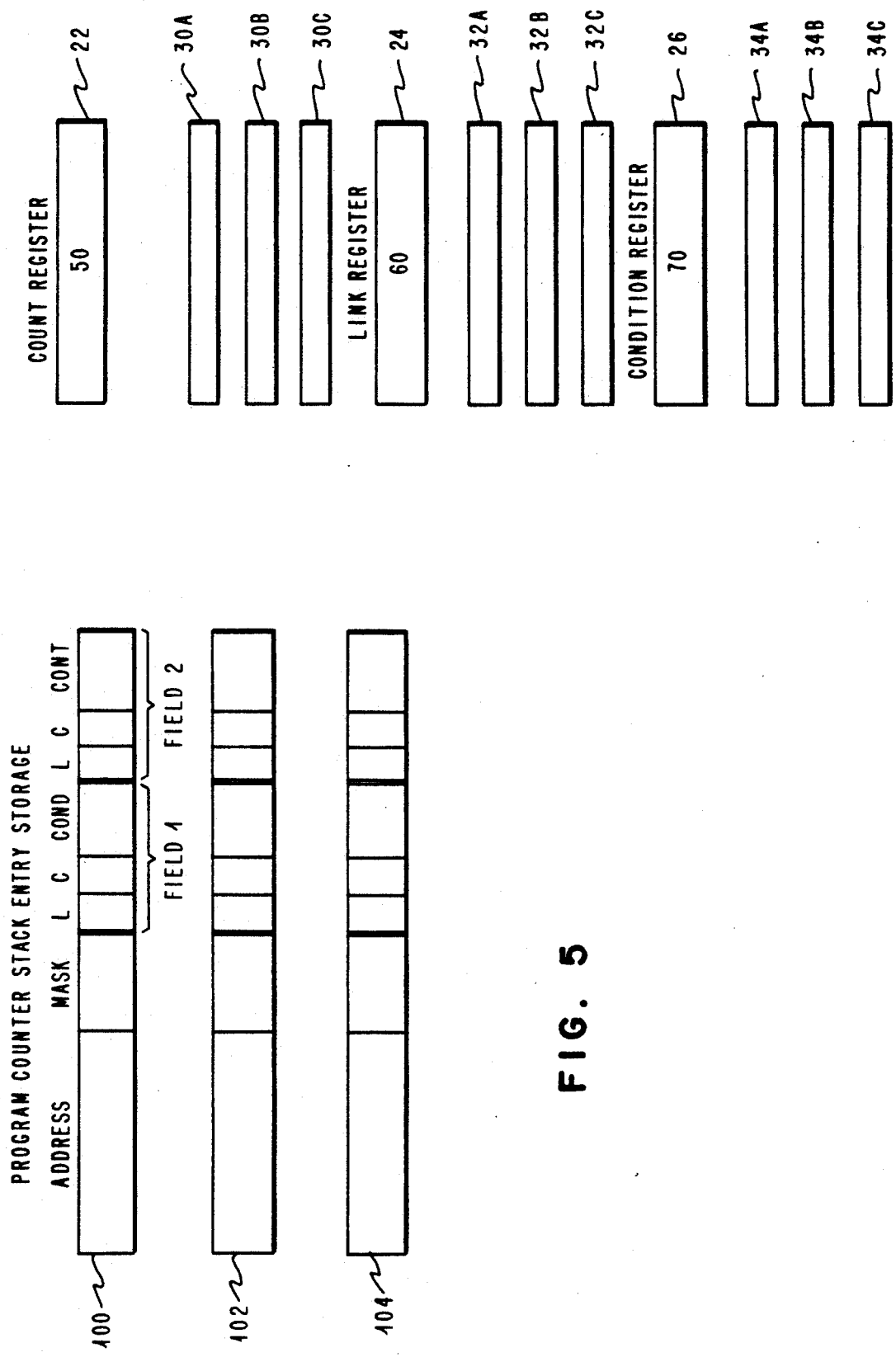
FIG. 5 is an illustration of the instruction registers and stack register contents during cycle zero.

FIG. 5 illustrates the contents of the program counter stack entry storage 36 consisting of entry positions 100, 102 and 104; the count register backup stack 30, consisting of entries 30a, 30b and 30c; the link register backup stack 32, consisting of entries 32a, 32b and 32c; and the condition register backup stack 34, consisting of entries 34a, 34b and 34c. Additionally, the initial contents of the count register 22, the link register 24 and the condition register 26 are illustrated as 50, 60 and 70 respectively. The actual value of these contents is arbitrary and is merely included to provide the reader with a trace the entries through this example.

Figure 6:
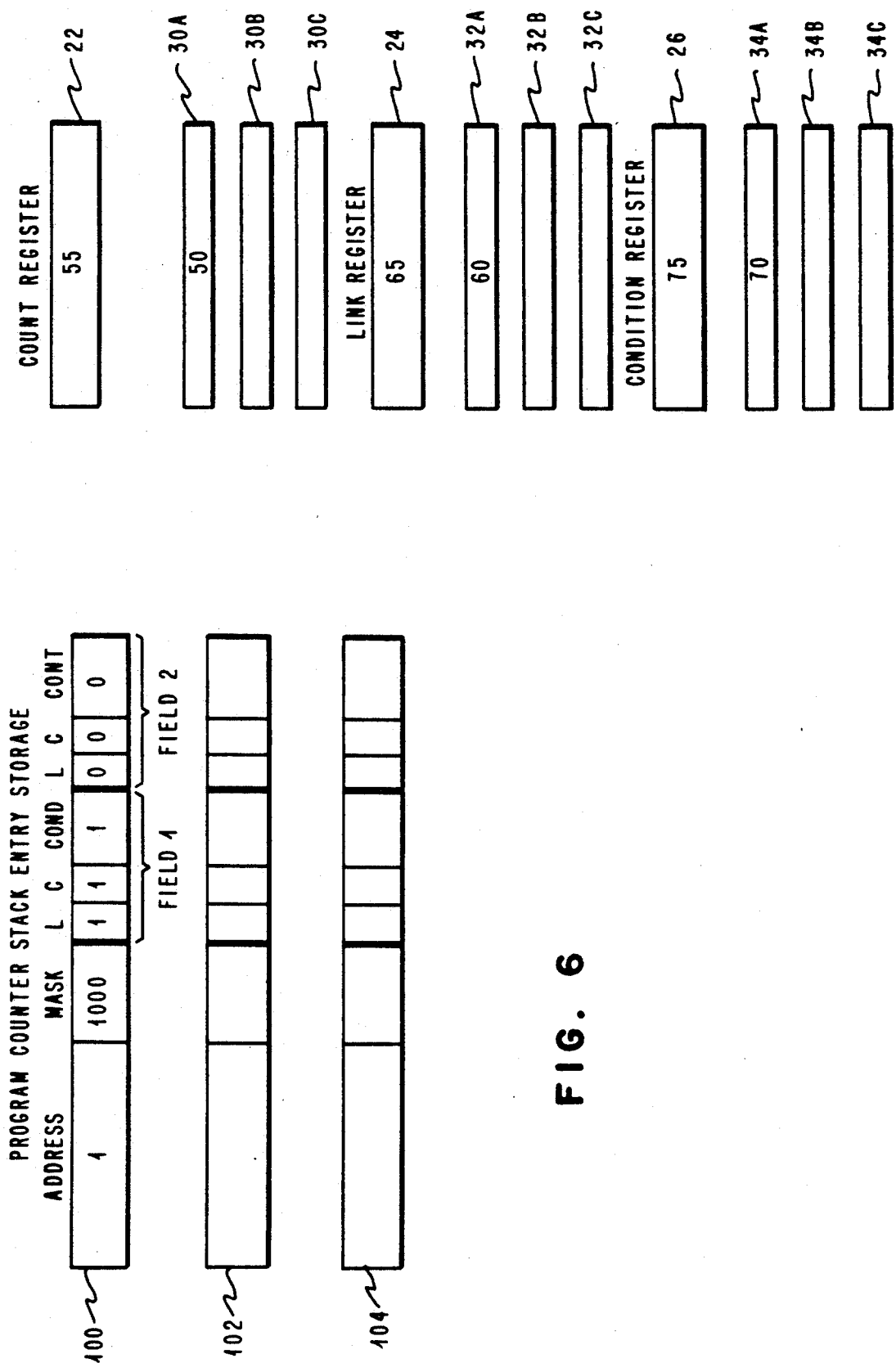
FIG. 6 is an illustration of the contents of the instruction registers and stack registers during cycle 1.

Referring to FIG. 6, during cycle 1, instructions 1 through 4 are dispatched. Since a load instruction (instruction 1) was dispatched, one entry will be added to the program counter stack entry storage 36. In this embodiment, only load and store instructions may generate interrupts. The base address of "1" is stored. The mask value is 1000 denoting that the first instruction is the location of the instruction that might cause an interrupt. If two instructions were included in the four instruction group, 2 bits of the mask field would be set to 1. The location of the bits denotes the location of the interrupt causing instructions in the 4 instruction sequence. Therefore, the mask bit positions can be used as offsets to the base address to provide the actual addresses of the interrupt causing instructions. The contents of field 1 are set if the count register 22, the link register 24, and the condition register 26 contents are changed during the execution of this four instruction sequence. In this example, the branch instruction sets the count register 22 and link register 24. The LCR (logic on condition register) instruction sets the contents of the condition register 26. The previous contents of these registers are stored as shown.

Figure 7:
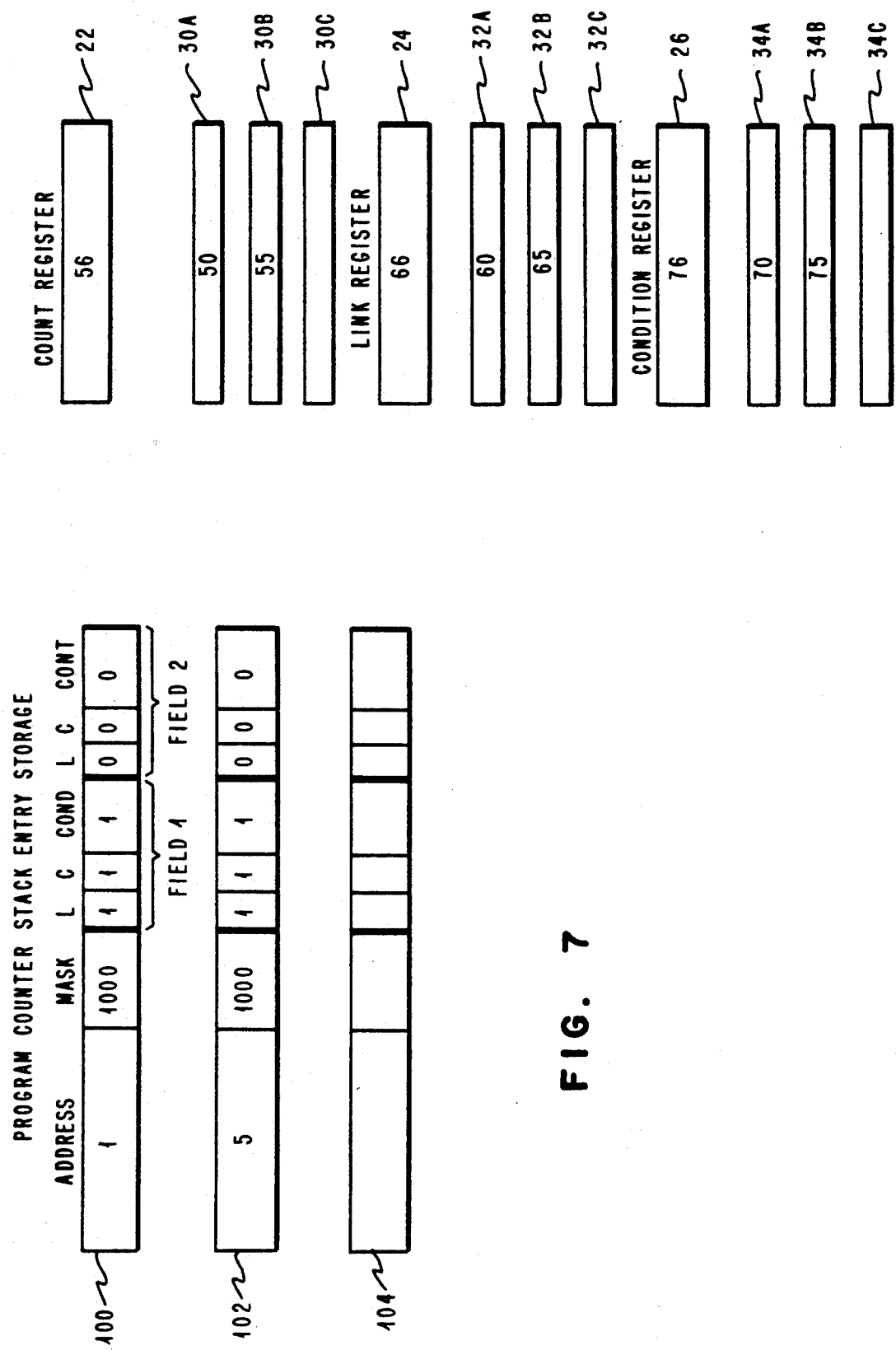
FIG. 7 is an illustration of the contents of the instruction registers and stack registers during cycle 2.
Figure 8:
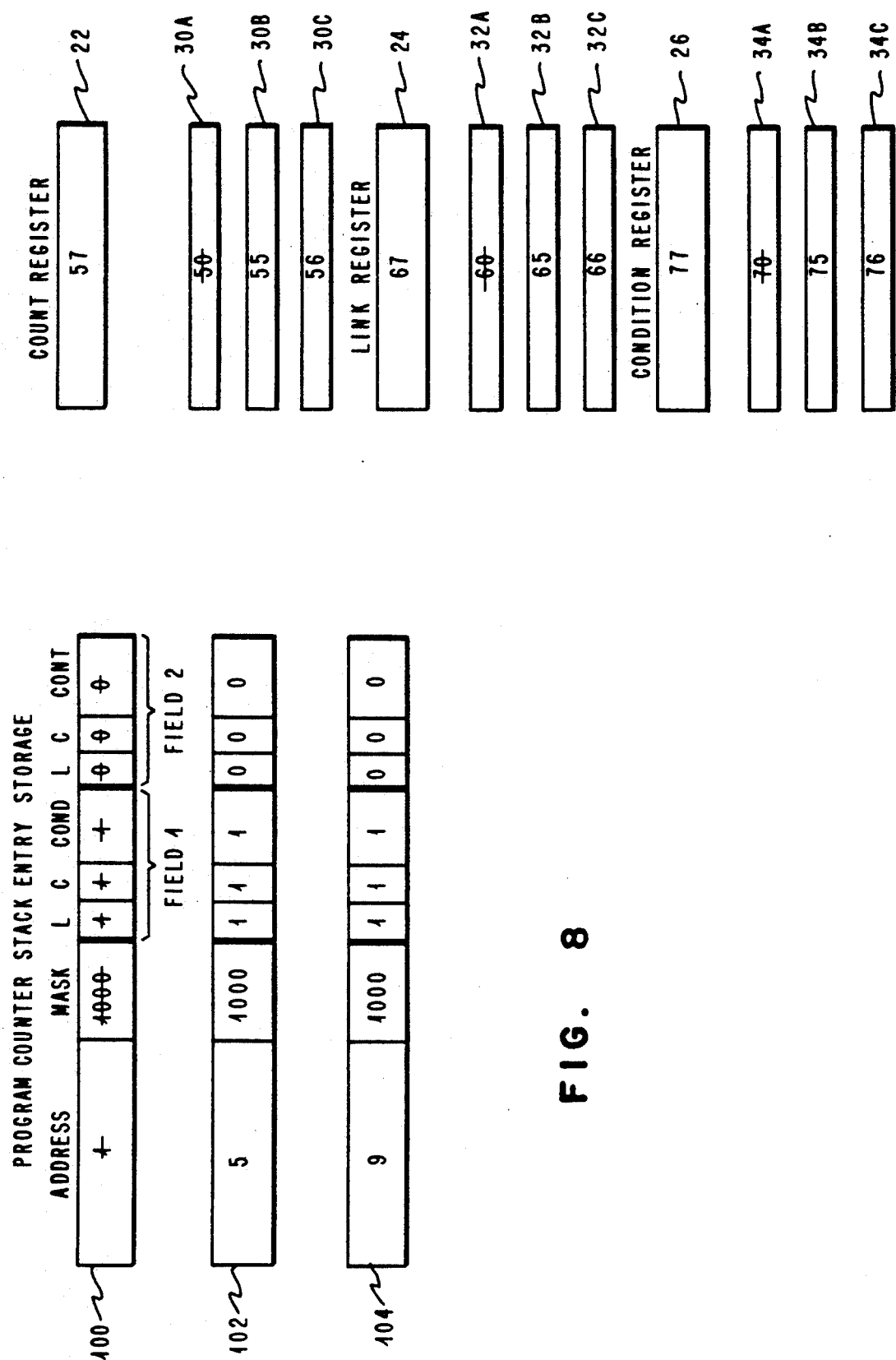
FIG. 8 is an illustration of the contents of the instruction registers and stack registers during cycle 3.

FIG. 7 illustrates the status after cycle 2. In cycle 2, instructions 5 through 8 (group II of FIGS. 15) are dispatched. Since group II is the exact same set of instructions as group I, the same actions occur to update the backup stacks respectively. Also, the execution of instructions 7 and 8 update the count register 22, the link register 24 and the condition register 26 as shown. The backup registers 30, 32 and 34 store the previous contents of the count register 22, the link register 24 and the condition register 26. Each cycle an interrupt causing instruction is dispatched a record of the dispatch cycle is written in to the program counter stack entry storage 36. If subsequent instructions cause the link register 24, the count register 22, or the condition register 26 to be updated, the old values of these registers are stored in the appropriate backup stacks and the respective tail pointers are incremented. There is a head and tail pointer for each backup stack. These pointers operate the three backup register locations as a circular queue. Therefore, each time an entry is made, the tail pointer is incremented. Each time an entry is removed, the head pointer is incremented. FIG. 8 illustrates the contents of the registers at the end of cycle 3 when the group III instructions have been dispatched. For this example, during cycle 3, the fixed point unit 18b executes instruction 1. For this example, instruction 1 did not cause an interrupt. Since only one interrupt causing instruction was dispatched during this cycle (cycle 1), the entire entry 100 may be removed. Using information in field 1, the backup register entries 30a, 32a and 34a are also removed. This is accomplished by incrementing the head pointer as previously discussed. Since the group III instructions are similar to groups I and II, the program counter stack storage entry 104 is as shown. Likewise, the count register 22, the link register 24 and condition register 26 are provided with values 57, 67 and 77 respectively. The previous values of these registers are stored in the appropriate entries in their backup stacks 30, 32 and 34 as shown.

Figure 9:
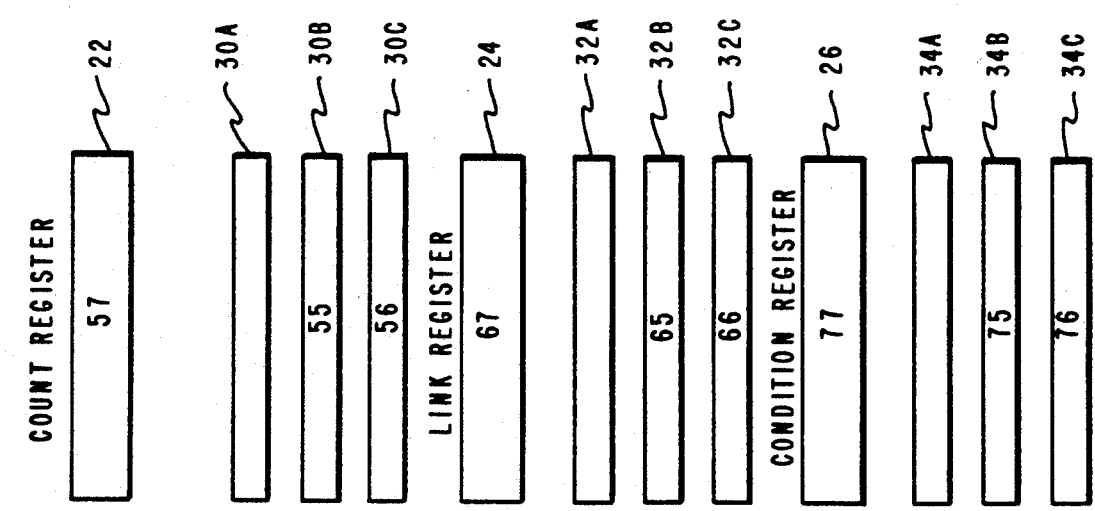
FIG. 9 is an illustration of the contents of the instruction registers and stack registers during cycle 4.
Figure 9:
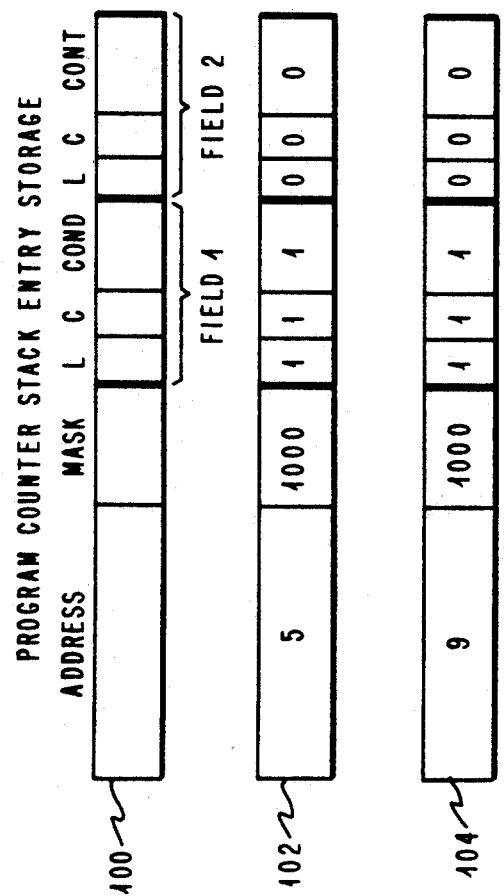

FIG. 9 illustrates the contents of these registers at the end of cycle 4. For this example, in cycle 4 instruction 2 was executed by the fixed point unit 18b. Since it is not a load or store instruction, it cannot cause an interrupt. Therefore, no entries need to be removed from the program counter stack entry storage 36.

Figure 10:
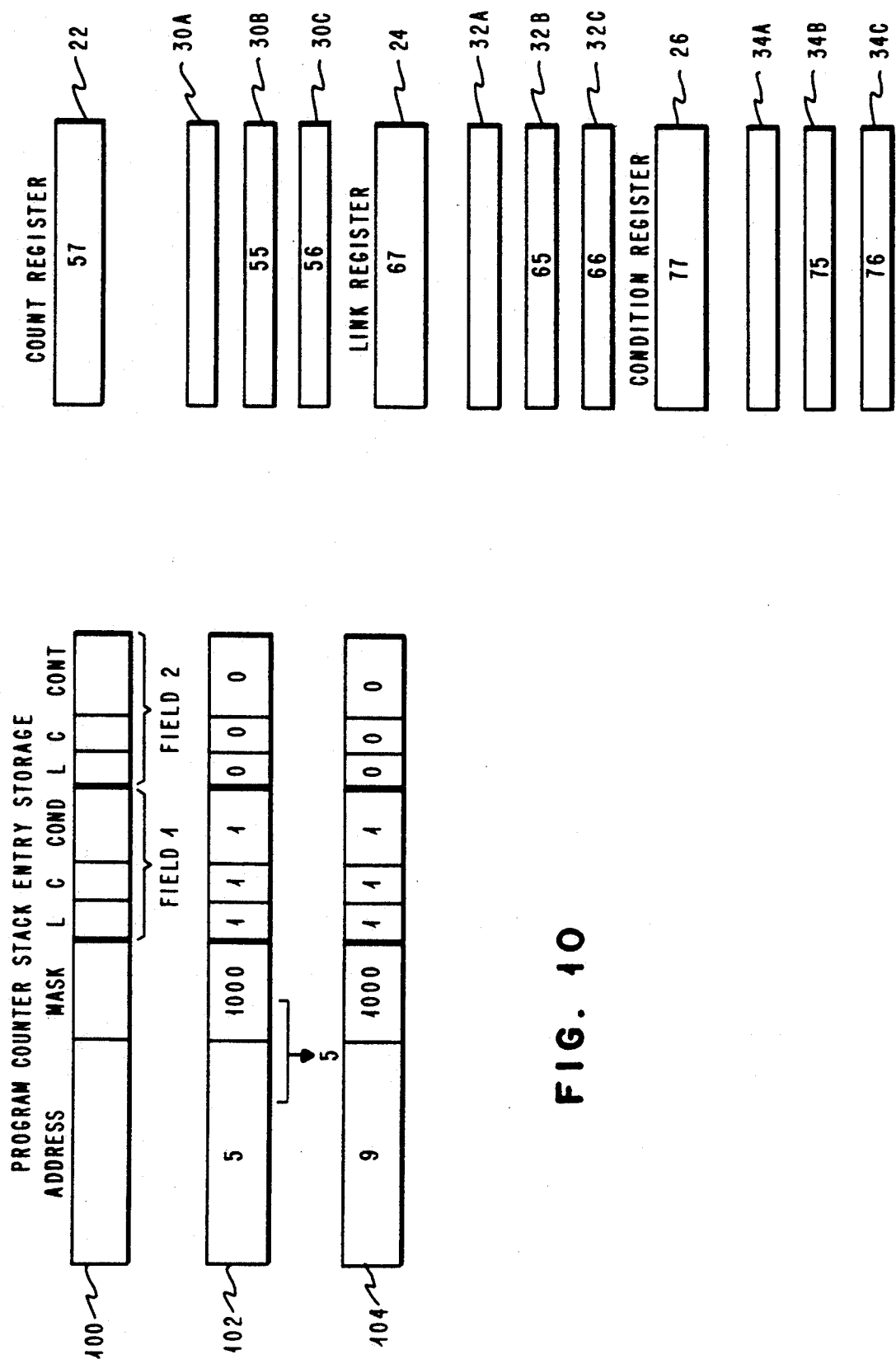
FIG. 10 is an illustration of the contents of the instruction registers and stack registers during cycle 5.

FIG. 10 illustrates the contents of the register at the end of cycle 5. During cycle 5, the fixed point execution unit 18b has executed instruction 5. For this example, this instruction has caused an interrupt. In this case, the offset mask bits (1000) are combined with the base address (5) to determine the position of the instruction that caused the interrupt. In this example, the address is 5. Additionally, since the field 1 tag bits were set for the count register 22, the link register 24 and the condition register 26, the backup values for these registers are provided to these registers. These values are stored in entries 30b, 32b and 34b respectively. The address of the interrupting instruction is provided to the branch execution unit 18a. Likewise, the backup register contents are provided to their respective registers. The program counter stack entry storage 36 and backup stacks 30, 32 and 34 are then purged of all information since this stored information is no longer relevant and the system is being reinitialized to the state when the instruction at location 5 was executed.

Figure 11:
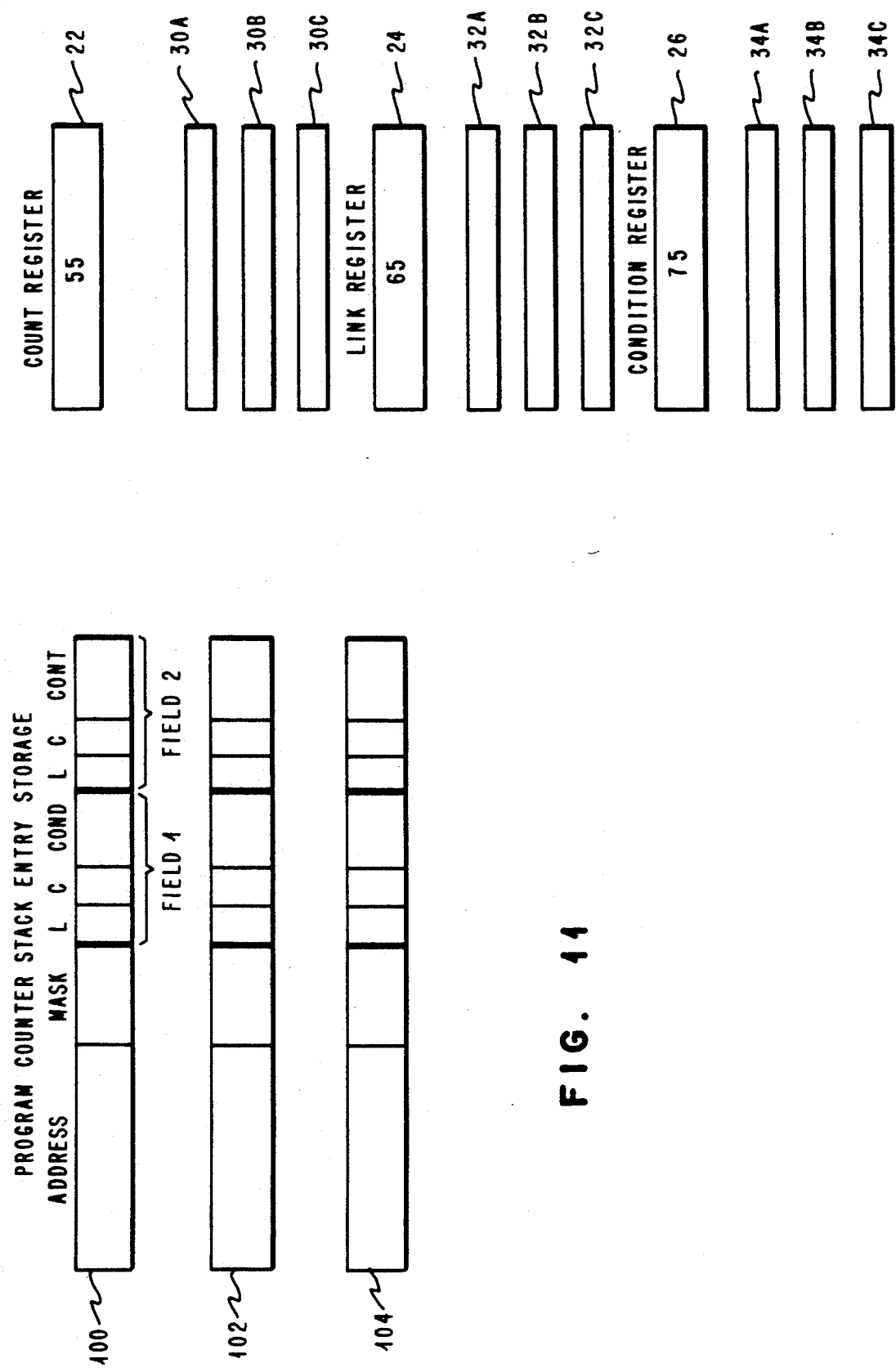
FIG. 11 is an illustration of the contents of the instruction registers and stack registers during cycle 6.

FIG. 11 illustrates the register contents at the end of cycle 6 when the condition register 22, the link register 24 and the condition register 26 have been updated. At the end of cycle 6, the system has been reinitialized and is ready to start again the execution of the instruction sequence starting at instruction 5.

In this embodiment, if a single program counter stack entry contains two instructions that might generate interrupts, the interrupts are received on a first-in, first-out basis. In other words, when an interrupt occurs, the oldest instruction that might generate an interrupt is assumed to have generated this interrupt. However, it should be apparent that in other systems the oldest instruction is not necessarily the instruction that causes the interrupt. The system could then determine the instruction that caused the interrupt by a tag that would be provided by the occurrence of the interrupt.

Therefore, in FIG. 11, the registers appear as if only instructions 1 through 4 have been executed.

Figure 12:
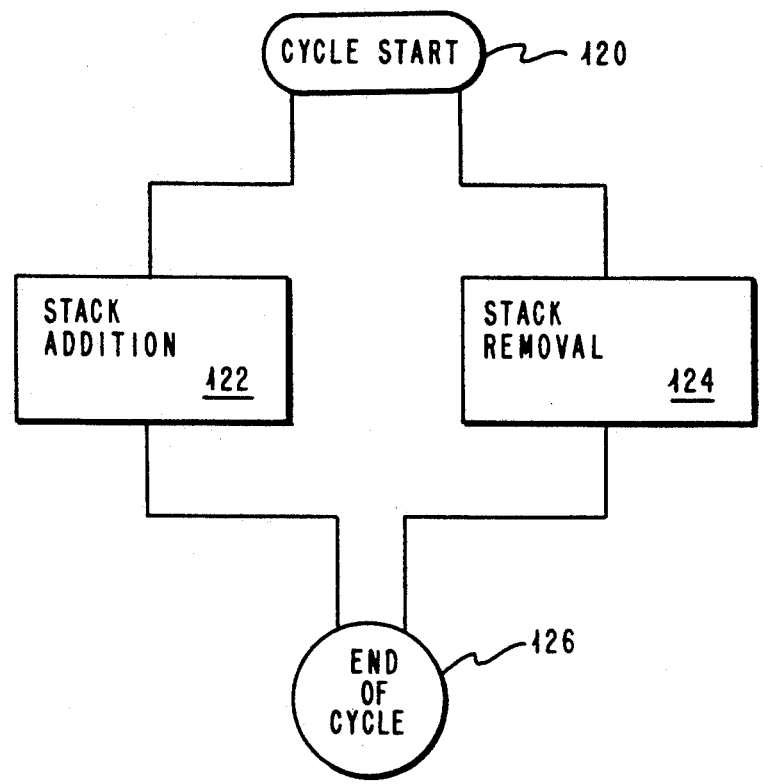
FIG. 12 is a flow chart illustrating the simultaneous execution of the stack addition function and the stack removal function.

FIG. 12 illustrates a state diagram depicting the concurrent execution of the stack addition function in logic 64 (state 122) and the execution of the stack removal function 124 in the stack removal logic 66. These functions 122 and 124 are executed during each cycle as depicted by states 120 and 126.

Figure 13:
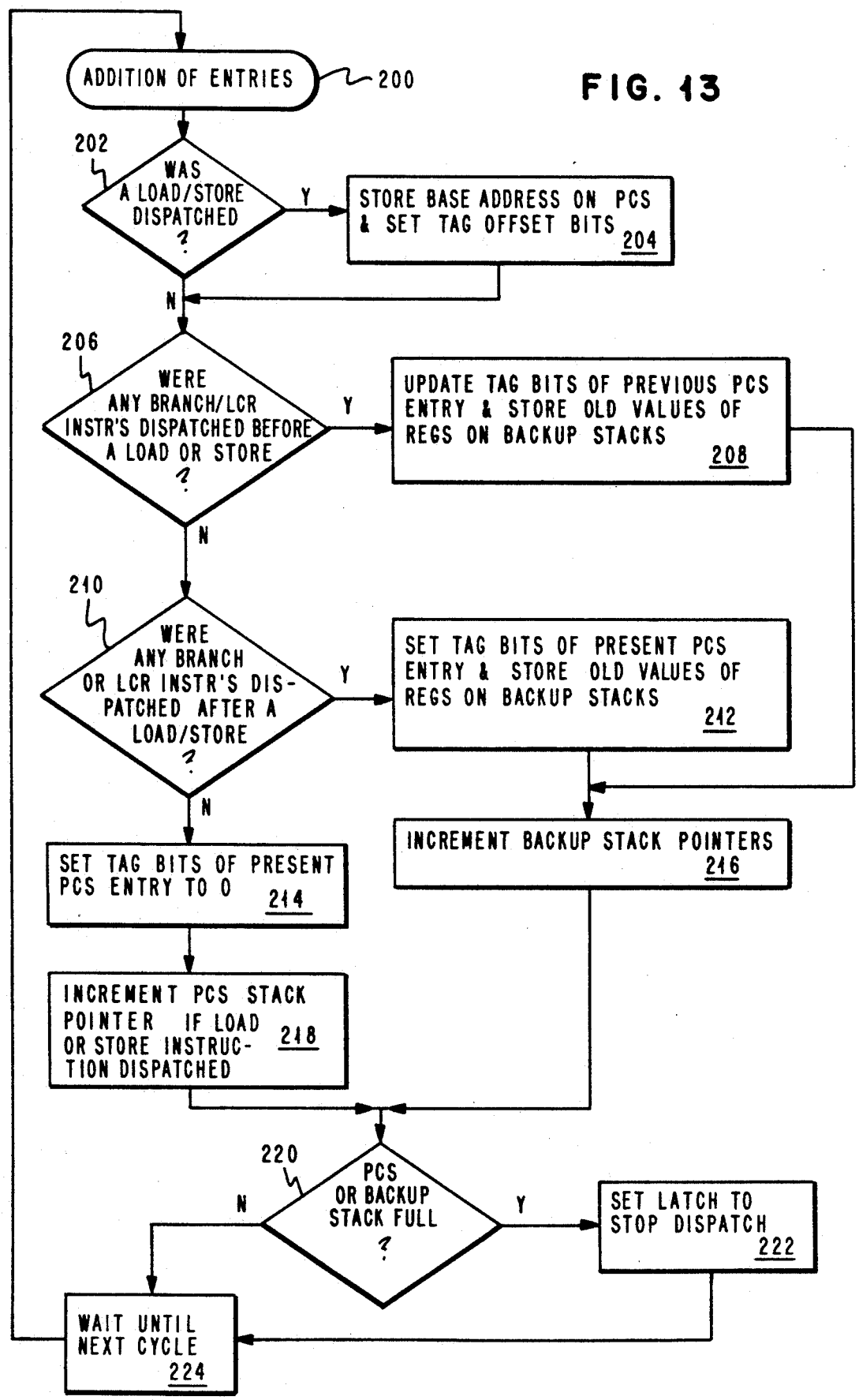
FIG. 13 is a flow chart illustrating the stack addition function.

FIG. 13 is a flow chart illustrating the stack addition function. At the beginning of the cycle, the stack addition logic 64 begins at step 200 and proceeds to step 202 to determine if a load or store instruction was dispatched. If so, the logic proceeds to step 204 to store the base address and set the tag offset bits of the program counter stack entry storage 36. If a load and store instruction was not dispatched or, after the base address and offset bits have been stored, the logic proceeds to step 206 to determine if any branch or LCR instructions were dispatched before a load or store instruction. If so, the tag bits of the previous program counter stack entry is updated and the old values of the count, link and condition registers are stored on the backup stacks. The program then proceeds to step 216. Returning to step 206, if no branch or LCR instructions were dispatched before a load or store instruction, the logic proceeds to step 210 to determine if any branch or LCR instructions were dispatched after a load or store instruction. If so, the logic proceeds to step 212 to set the tag bits of the present program counter storage entry and to store the old values on the backup stacks. Then in step 216, the backup stack pointers 39 are incremented. Returning to step 210, if no branch or LCR instructions were dispatched after a load or store instruction, the logic proceeds to step 214 to set the tag bits of the present program counter stack entry to zero. Then, in step 218, the pointer to the program counter stack entry is incremented if a load or store instruction was dispatched. Then in step 220, the logic determines if the program counter stack entry storage is full. If so, a latch is set in step 222 to send the stop dispatch signal to the instruction issue logic 17. In step 224, the logic 64 waits until the next cycle has occurred when it returns to step 200.

Figure 14:
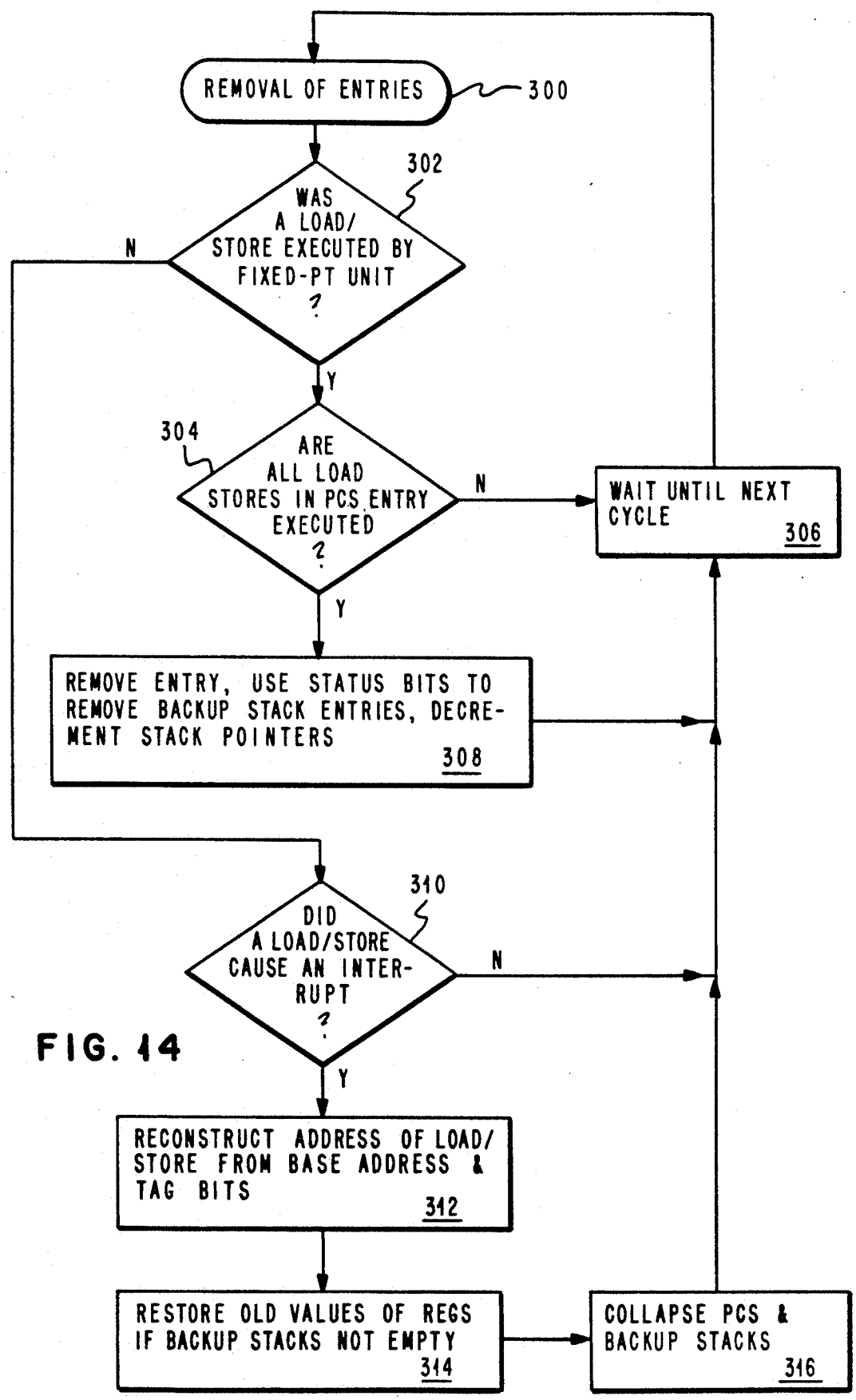
FIG. 14 is a flow chart illustrating the stack removal function.

FIG. 14 is a flow chart illustrating the stack removal procedure performed by logic 66. Upon the beginning of a cycle, the logic 66 moves from step 300 to step 302 to determine if a load or store instruction has been executed by the fixed point execution unit. If not, the logic proceeds to step 310. If so, the logic proceeds to step 304 to determine if all load and store instructions in the program counter stack entry storage were executed. If not, the program proceeds to step 306 to wait until the next cycle. If all of the load and store instructions for the entry were executed, the logic proceeds to step 308 to remove the entry and use the status bits to remove the backup stack entries and to decrement all of the pointers. Upon the completion of step 308, the logic proceeds to step 306 to wait for the next cycle.

Returning to step 310, the logic determines if a load or store instruction caused an interrupt. If not, the logic proceeds to step 306. If an interrupt has occurred, the logic proceeds to step 312 to reconstruct the address of the load and store instruction from the base address and tag bits in the program counter stack entry. Then, in step 314, the old values of the link 24, count 22 and condition registers 26 are stored if appropriate. In step 316, the contents of the program counter stack entry storage 36 and the respective backup registers are purged since these values would no longer be relevant. The logic 66 then proceeds to step 306 to wait for the next cycle.

While the invention has been described with reference to the illustrated embodiment, this description is not intended to be construed in a limiting sense. Various modifications of the illustrated embodiment as well as other embodiments of the invention will become apparent to those persons skilled in the art upon reference to this description. It is, therefore, contemplated that these appended claims will cover any such modifications or embodiments as fall within the true scope of this invention.

I claim:
1. A data processing system for executing a sequence of instructions, said data processing system comprising:
   a plurality of processors, each for executing instructions of the sequence of instructions;
   means for dispatching each instruction of the sequence of instructions to less than all of the processors; and
   control means for directing a concurrent execution of said dispatched instructions in said plurality of processors irrespective of locations of the instructions in the sequence, said control means including means for receiving an instruction interrupt signal, and means for resetting, in response to said instruction interrupt signal, said plurality of processors and said dispatching means to a previous state existing before initiation of execution of the instruction that caused the instruction interrupt signal in order to completely re-execute the instruction that caused the instruction interrupt signal.

2. A data processing system according to claim 1 wherein said control means includes means for determining which instruction generated the instruction interrupt signal.

3. A data processing system for according to claim 2 wherein at least one of said processors includes at least one register and said control means includes means for recording the contents of said at least one register.

4. A data processing system according to claim 3 wherein said control means includes means for recording the instructions dispatched by said dispatching means.

5. A data processing system according to claim 4 wherein said means for recording the dispatched instructions includes means for indicating any changes to the at least one processor register.

6. A data processing system according to claim 5 wherein said means for recording the dispatched instructions includes means for recording a base address and an offset from the base address for each instruction that is capable of generating an instruction interrupt.

7. A data processing system according to claim 6 wherein said means for recording the dispatched instructions includes means for combining the base address with the offset to provide an address of an instruction causing an interrupt.

8. A data processing system according to claim 7 wherein said control means further includes a means for assigning an instruction record to a processor register record.

9. A data processing system according to claim 8 wherein said control means further includes means to restore the at least one processor register with the processor register record when the instruction assigned to the processor record register has generated an instruction interrupt.

10. A method for executing a sequence of instructions in a data processing system having a plurality of processors, each for executing instructions and a circuit for dispatching instructions to the processors, and further including a control circuit for directing the concurrent execution of the dispatched instructions in the processors, the method including the steps of:
   dispatching each instruction of said sequence of instructions by said dispatching circuit to less than all of said processors;
   concurrently executing said dispatched instructions in said processors;

receiving an instruction interrupt signal;
resetting the plurality of processors and the dispatching circuit, under control of said control circuit in response to said instruction interrupt signal, to a previous state existing before the initiation of execution of the instruction that caused the instruction interrupt signal in order to completely reexecute the instruction that caused the instruction interrupt signal; and completely reexecuting the instruction that caused the instruction interrupt signal.

* * * * *